(12) United States Patent
Werner

(10) Patent No.: US 12,349,796 B2
(45) Date of Patent: Jul. 8, 2025

(54) SMART ADJUSTABLE BED SYSTEM

(71) Applicant: WERNER MEDIA PARTNERS LLC, Plantation, FL (US)

(72) Inventor: Marc L. Werner, Plantation, FL (US)

(*) Notice: Subject to any disclaimer, the term of this patent is extended or adjusted under 35 U.S.C. 154(b) by 0 days.

(21) Appl. No.: 17/815,942

(22) Filed: Jul. 28, 2022

(65) Prior Publication Data

US 2022/0378214 A1    Dec. 1, 2022

Related U.S. Application Data

(63) Continuation of application No. 17/578,104, filed on Jan. 18, 2022, which is a continuation of application No. 15/986,806, filed on May 22, 2018, now Pat. No. 11,224,295.

(60) Provisional application No. 62/509,709, filed on May 22, 2017.

(51) Int. Cl.
*A47C 20/04* (2006.01)
*A47C 19/12* (2006.01)
*A47C 20/08* (2006.01)
*A47C 21/00* (2006.01)
*A47C 31/00* (2006.01)
*A61G 7/015* (2006.01)
*A61G 7/018* (2006.01)
*G05B 15/02* (2006.01)

(52) U.S. Cl.
CPC ............ *A47C 20/041* (2013.01); *A47C 19/12* (2013.01); *A47C 20/08* (2013.01); *A61G 7/015* (2013.01); *A61G 7/018* (2013.01); *A47C 21/003* (2013.01); *A47C 31/008* (2013.01); *A61G 2203/42* (2013.01); *G05B 15/02* (2013.01)

(58) Field of Classification Search
CPC ... A47C 20/041; A47C 1/03211; A47C 19/12; A47C 31/008; G05B 15/00; A61G 7/015
See application file for complete search history.

(56) References Cited

U.S. PATENT DOCUMENTS

2002/0059679 A1* 5/2002 Weismiller ........... A61G 7/0514
 5/610
2017/0112716 A1* 4/2017 Rawls-Meehan ...........................
 A61H 23/0263

* cited by examiner

*Primary Examiner* — Said Bouziane
(74) *Attorney, Agent, or Firm* — Cotman IP Law Group

(57) ABSTRACT

A smart adjustable bed system combines an adjustable bed, a smart hub, a server, and smart devices to provide a system for controlling the raising and lowering of the adjustable bed. The smart hub acts as a gateway interconnecting the smart adjustable bed and a remote server capable of powerful voice recognition and artificial intelligence at a shared price. The system includes methods of using the system to allow an additional smart device such as a tablet computer to act as a remote control for the smart adjustable bed. The system further enables voice controls to be used to raise and lower the adjustable bed. Lastly, the voice recognition of the smart hub can be used to detect snoring and to send a signal to the adjustable bed to raise the bed to a position until the user reaches a position where snoring stops.

17 Claims, 5 Drawing Sheets

SMART ADJUSTABLE BED SYSTEM

CROSS-REFERENCE TO RELATED APPLICATIONS

This application is a continuation of prior application Ser. No. 17/578,104, filed Jan. 18, 2022, which is a continuation of prior application Ser. No. 15/986,806, filed May 22, 2018, which claims the benefit of U.S. Provisional Application No. 62/509,709, filed May 22, 2017, all of which are hereby incorporated by reference.

PRIOR ART

The invention relates to adjustable beds and voice activated smart devices.

BACKGROUND OF THE INVENTION

Adjustable beds are beds with section that are raised and lowered by motors to change the sleeping position of users.

A wired remote can be connected to the motor. The wired remote is used to signal the motors to raise or lower sections of the bed.

Adjustable beds can include a computer that can control the motors of the adjustable bed to provide preset positions to the user.

An adjustable bed with a wired remote exists that allows a first user to adjust the sleeping position of a second user so that the first user can stop the second user from snoring.

SUMMARY OF THE INVENTION

An object of the invention is to provide a smart adjustable bed that overcomes the disadvantages of the devices and methods of this general type and of the prior art.

With the foregoing and other objects in view there is provided, in accordance with the invention, a smart adjustable bed. The smart adjustable bed includes a motor for raising and lowering a mattress on the bed. The motor is connected to a computer that receives signals and controls the motor. The computer is connected to a receiver that can receive messages from a device cloud to raise or lower the bed.

With the foregoing and other objects in view there is provided, in accordance with the invention, a smart motion furniture. Motion furniture includes sofas, chairs, and recliners. The smart adjustable furniture includes a motor for reconfiguring the furniture and/or moving a person using the furniture. The motor is connected to a computer that receives signals and controls the motor. The computer is connected to a receiver that can receive messages from a device cloud to move the motion furniture.

The invention includes a smart hub such as those sold under the trade names ALEXA, ECHO, GOOGLE HOME, and SMARTTHINGS. The smart hub is a gateway or home controller. The smart hub allows users to control, automate, and monitor their home environment via voice, signal, or mobile device. The smart hub can be configured to fit each user's needs.

The smart hub can connect to a home's internet router and can be compatible with communication protocols such as ZigBee, Z-Wave, and IP-accessible devices. The smart hub serves to connect sensors and devices to one another and to the cloud.

The smart hub can interact with cloud-based voice interaction systems. The smart hub can control other the smart adjustable bed by using voice commands.

The smart hub can be configured to listen for snoring and then send a signal to raise a sleeper's bed, which in turn prevents snoring. The listening function can be initiated by giving the smart hub a voice command.

Other features that are considered as characteristic for the invention are set forth in the appended claims.

The construction and method of operation of the invention and additional objects and advantages of the invention is best understood from the following description of specific embodiments when read in connection with the accompanying drawings.

DETAILED DESCRIPTION OF THE INVENTION

Figure 1:
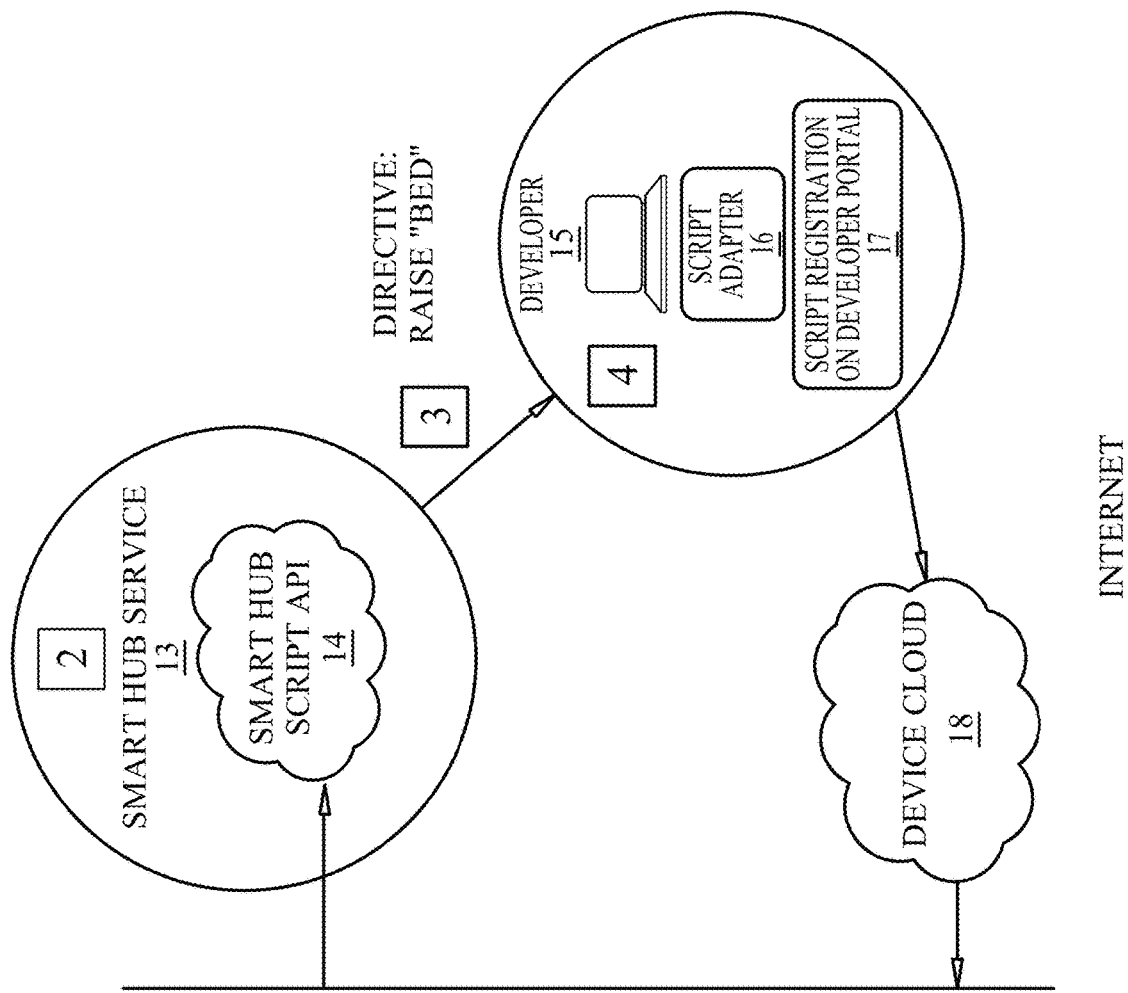
FIG. 1 is a schematic of an adjustable bed smart device according to the invention.
Figure 1:
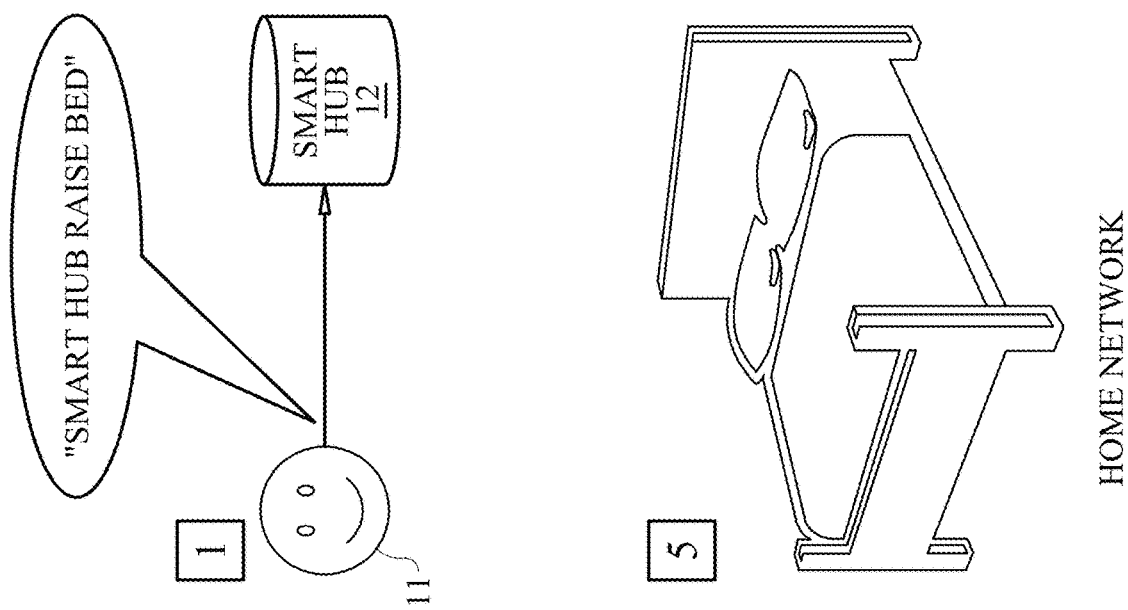

The following describes the parts of a smart adjustable-bed system and a method for using the adjustable bed smart device to raise and lower a bed.

A customer 11 is the person interacting with a smart hub 12 and the owner of the cloud-enabled smart adjustable bed 19. The customer 11 issues voice commands that are recorded by a microphone in the smart hub 12.

The smart adjustable-bed system includes the following parts.

The smart hub API 14 is a cloud-hosted computer service that understands the voice commands recorded by and received from the smart hub 12 and converts the voice commands to directives (JSON messages) that are sent to smart home script API 14.

A hosted script adapter 16 receives directives from the smart home script API 14. The script adapter 16 is a cloud-based computer service that hosts the smart home script code.

A smart home script is code and configuration that interpret directives and sends messages to a device cloud 18.

A device cloud 18 is the cloud environment provided by the bed manufacturer that controls and manages the customer's cloud-enabled smart adjustable bed.

The following example demonstrates how a customer 11 raises his or her adjustable smart bed 30.

In step 1, the customer 11 who has previously added the bed 19 to the customer's device cloud 18 says, "Smart hub, raise bed" to the customer's smart hub 12.

In step 2, the smart hub 12 hears this instruction and sends the instruction to the smart hub service 13 for interpretation.

In step 3, the smart hub script API 14 interprets the action as "raise" and the device name as "bed". The smart hub script API 14 composes a message to send to the script adapter 14 that controls the bed 19. This message is called a directive.

The directive includes: the action (raise), the device identifier (an ID representing the bed 19 that the customer named "bed"), and information authenticating the customer 11.

In step 4, the script adapter 16 receives and parses the request for the action, the device identifier, and authentication details. The script adapter 16 uses this information to communicate with the device cloud 18. The script adapter 16 generates a message to the customer's device cloud 18, and tells the adjustable bed 19 to raise.

In step 5, the device cloud 18 gets the message and the smart adjustable bed 19 raises.

In a step that is not shown, the script adapter 16 sends a response back to the smart home script API 14 indicating whether the script adapter 16 successfully raised the smart adjustable bed 19. The smart hub 12 uses this response to determine the appropriate response to the customer 11. For example, the smart hub 12 might say, "OK" to indicate the requested action is complete.

A developer 15 is a writer of a smart home script. The developer 15 follows protocols set by the smart hub service 13. The smart hub service 13 knows how to interpret the customer's speech and generate messages to send to smart home scripts.

Generally, smart home script development falls into two categories. First, developers 15 who represent the smart adjustable bed 19 manufacturer that want to enable customers 11 to interact with the smart adjustable bed 19 using the voice of the customer. Second, developers 15 who want to create a script for the smart adjustable bed, either for their own private use or general public use. Certification is required for public use.

In a second preferred embodiment, the customer 11 who has previously added the bed 19 to the customer's device cloud 18 says, "Smart hub, stop snoring" to the customer's smart hub 12.

In step 2, the smart hub 12 hears this instruction and sends the instruction to the smart hub service 13 for interpretation.

In step 3, first, the smart hub script API 14 interprets the action as "listen for snoring" and the device name as "smart hub" The smart hub script API 14 composes a message to send to the script adapter 14 that controls the smart hub 12. This message is called a directive. The directive includes: the action (listen for snoring), the device identifier (an ID representing the smart hub 12 to which the customer 11 gave the instruction), and information authenticating the customer 11. Next, if the smart hub 12 hears snoring, the smart hub script API 14 composes a message to send to the script adapter 14 that controls the smart adjustable bed 19. This directive includes the following information: the action (raise), the device identifier (an ID representing the smart adjustable bed 19 that is to raise).

In step 4, the script adapter 16 receives and parses the request for the action, the device identifier, and authentication details. The script adapter 16 uses this information to communicate with the device cloud 18. The script adapter 16 generates a message to the customer's device cloud 18, and tells the adjustable bed 19 to raise.

In step 5, the device cloud 18 gets the message and the smart adjustable bed 19 raises.

In an embodiment that is not shown, a smart device such as a tablet or smart phone can be used send instructions to raise or lower the smart adjustable bed to the smart hub 12. In addition, the microphone in the smart phone or tablet can be used to detect when the customer 11 is snoring.

Figure 2:
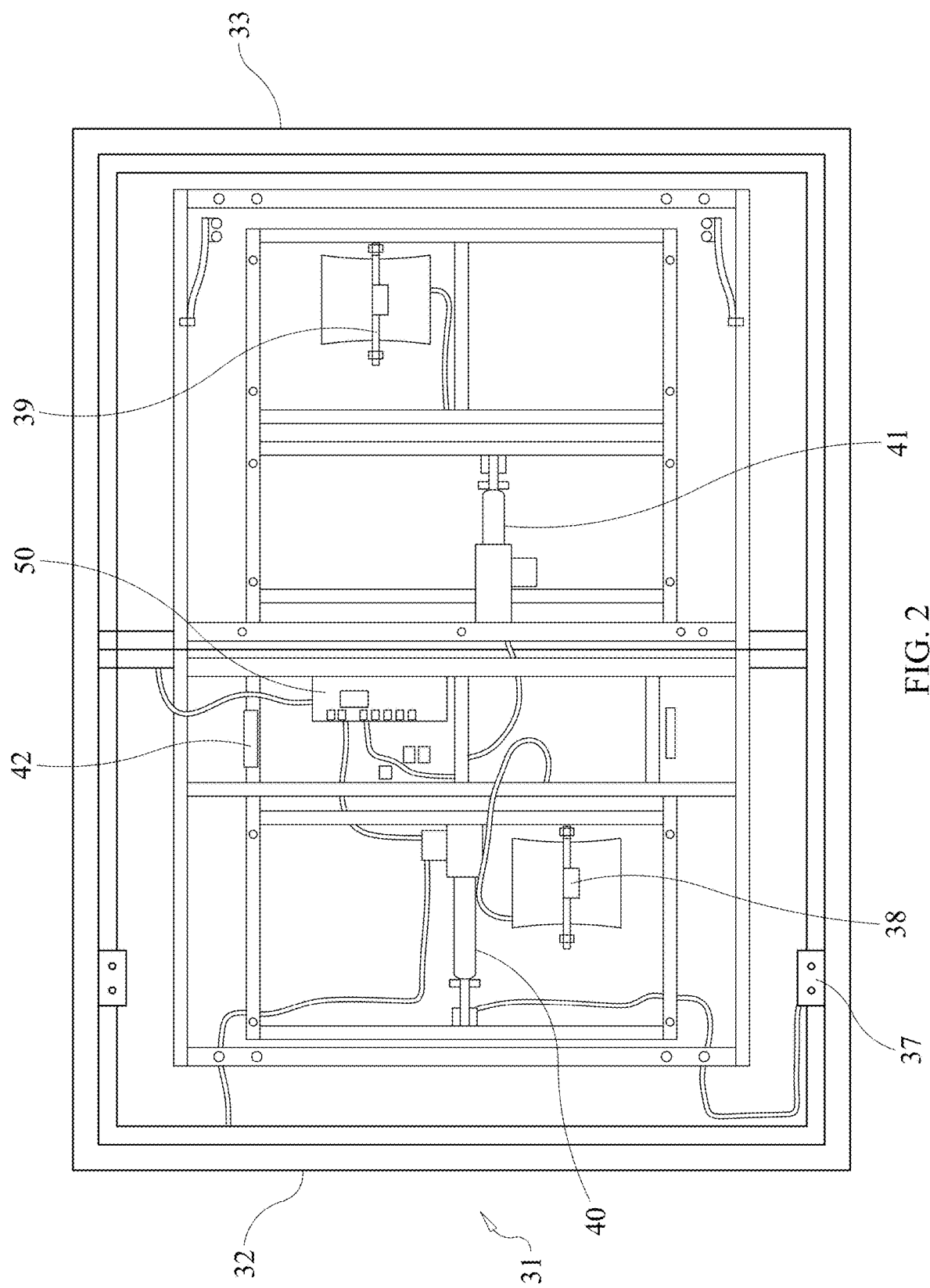
FIG. 2 is a bottom view of smart adjustable bed according to the invention.
Figure 3:
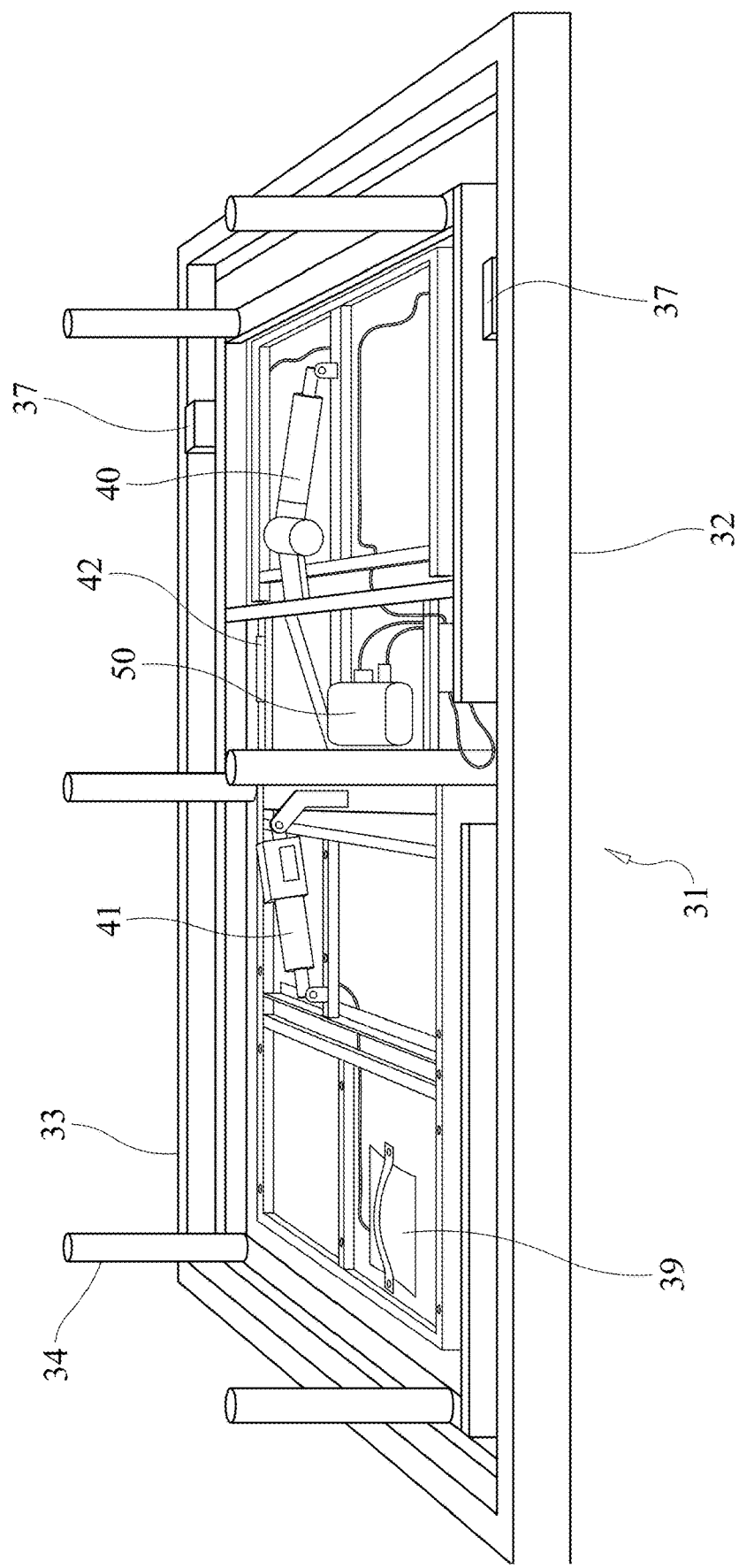
FIG. 3 is a bottom perspective view of the smart adjustable bed shown in FIG. 2.
Figure 4:
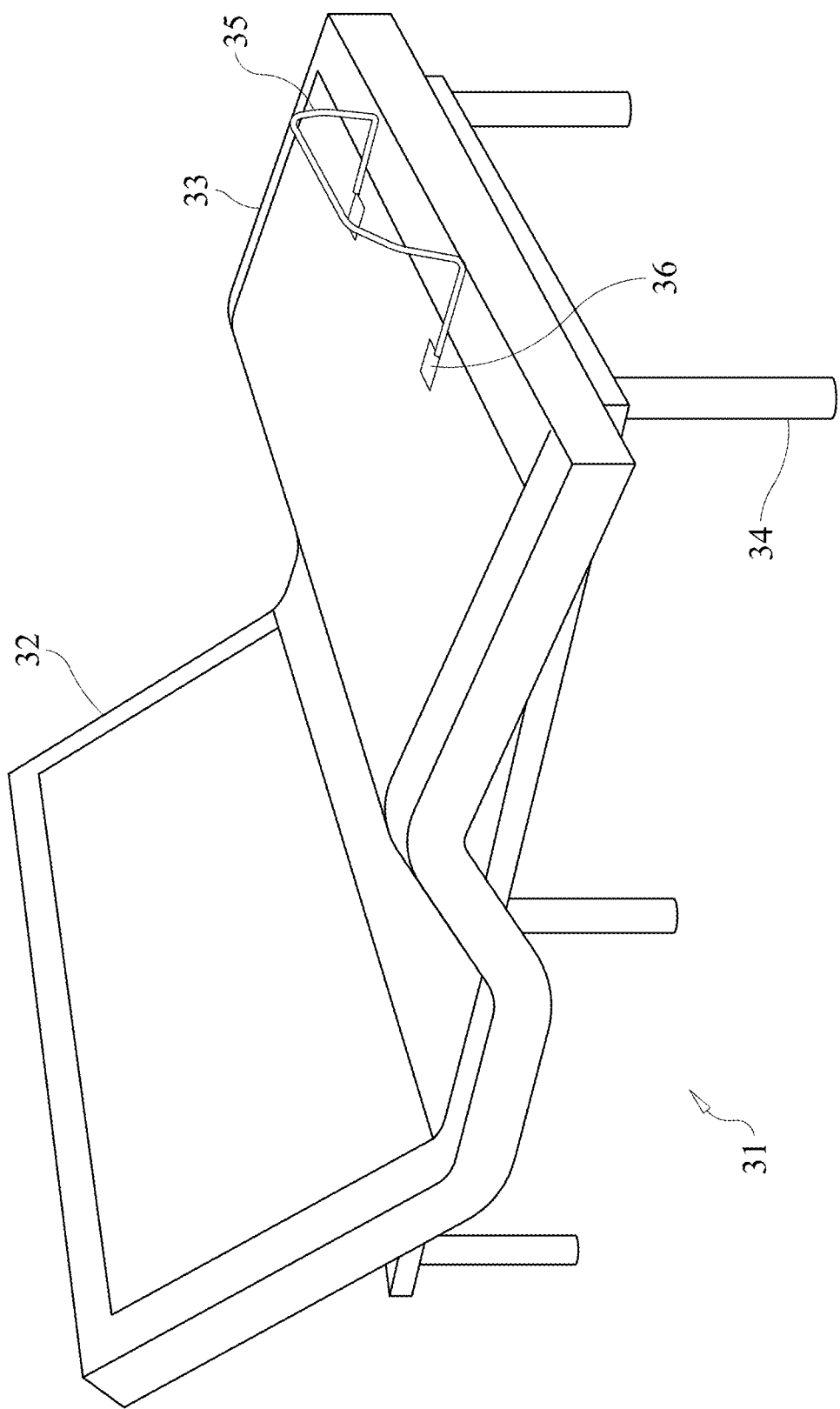
FIG. 4 is a top perspective view of the smart adjustable bed shown in FIG. 2.

FIGS. 2-4 show a preferred embodiment of a smart adjustable bed. The smart adjustable bed 19 includes a bedframe 31. The bedframe 31 is divided into a head frame piece 32 and a foot frame piece 33. Six legs 34 are connected to the bedframe 31. The head frame piece 32 moves relative to the foot head piece 33 to move the smart adjustable bed from a flat position as shown in FIG. 3 to an inclined position as shown in FIG. 4.

FIGS. 2-3 show the bottom of the bedframe 31. A controller 50 is disposed on the bottom of the bedframe 31. The controller 50 is connected to a head motor 40. The controller 50 sends an incline signal to the head motor 40 to activate the head motor 40. The head motor 40 raises the head frame piece 32 from the flat position to the inclined position. The controller 50 sends a decline signal to the head motor 40 to activate the head motor 40. The head motor 40 lowers the head frame piece 32 after receiving the decline signal. The head motor 40 can be stopped at any time to control the amount of inclination. A sensor connected to the controller 50 detects an amount of inclination of the head frame piece 32.

The controller 50 is connected to a foot motor 41. The controller 50 sends an incline signal to the foot motor 41 to activate the foot motor 41. The foot motor 41 raises the food frame piece 33 from the flat position to the inclined position. The controller 50 sends a decline signal to the foot motor 41 to activate the foot motor 41. The foot motor 41 lowers the foot frame piece 33 after receiving the decline signal. The foot motor 41 can be stopped at any time to control the amount of inclination. A sensor connected to the controller 50 detects an amount of inclination of the foot frame piece 33.

Devices such a USB port 37, head massage motor 38, foot massage motor 39, and LED lights are connected to the controller 50. The controller 50 sends signals to activate and deactivate the devices.

FIG. 4 shows retainer bar 35. The retainer bar 35 prevents a mattress (not shown) from slipping from the bedframe 31, particularly when the bedframe is in an inclined position as shown in FIG. 4. The retainer bar 35 connects to the bedframe 31 with quick connect brackets 36.

Figure 5:
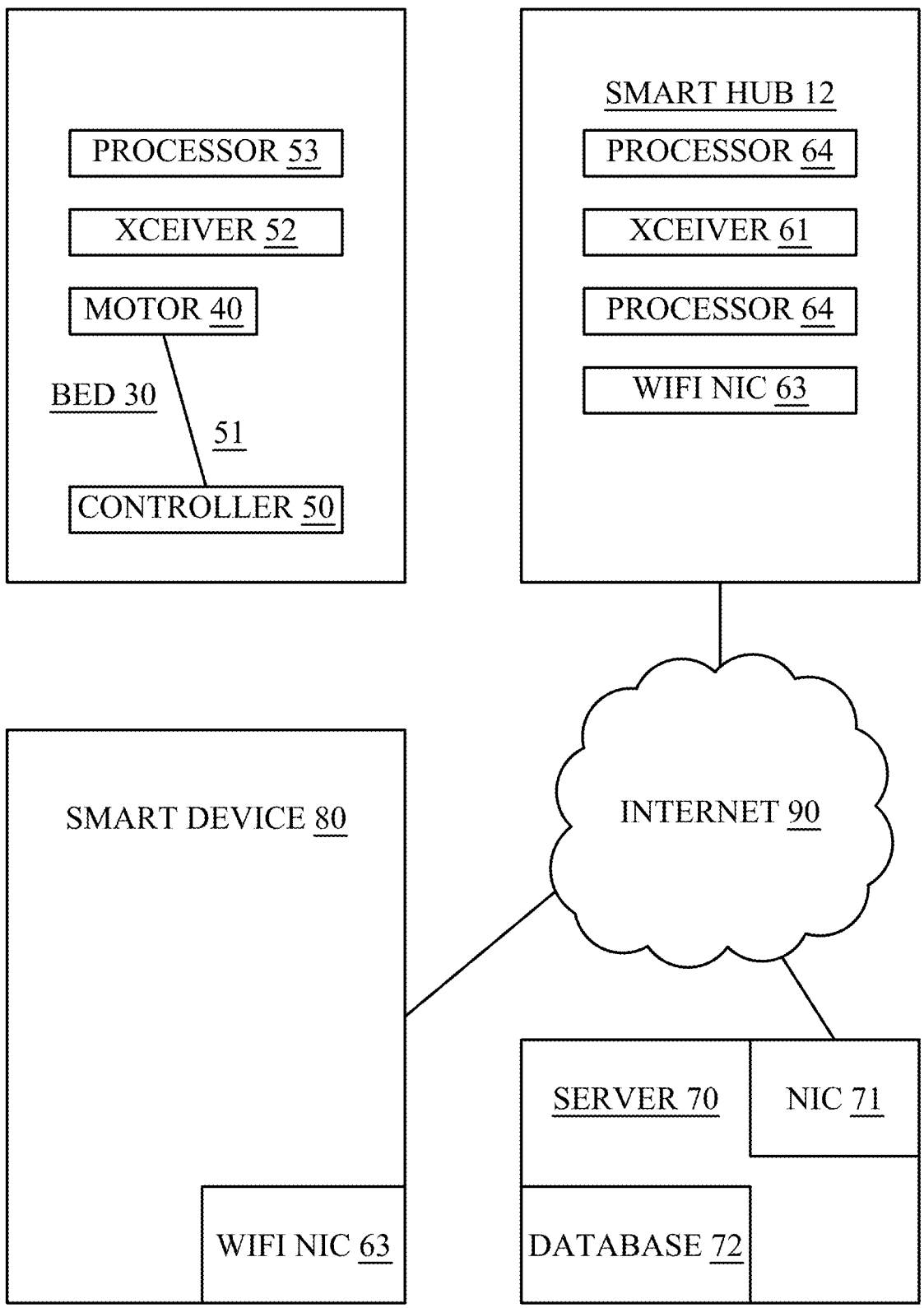
FIG. 5 is a schematic view of the smart adjustable bed system.

FIG. 5 shows a preferred embodiment of smart adjustable bed system. The smart adjustable bed system includes a smart adjustable bed 30, a smart hub 12, a server 70, and a smart device 80.

The smart adjustable bed 30 includes a smart adjustable bedframe 31 as previously described with a mattress disposed on the top of the bedframe 31. The bedframe 31 includes a motor 40. When the motor 40 can be operated in two directions: the first to cause the bed to incline and the second to cause the bed to decline. A bus 51 interconnects the motor 40 and the controller 50. The controller 50 sends an incline signal on the bus 51 to the motor causing the motor to incline the bedframe piece 32. The controller 50 sends a decline signal on the bus 51 to the motor causing the motor to decline the bedframe piece 32. The incline signal and decline signal are each preferably binary (i.e., on/off signals). The motor 40 includes a sensor that sends data describing the position of the bedframe (i.e., flat, inclined, 50% inclined) to the controller 50 via the bus 51.

The controller 50 includes a wireless transceiver 52 and a controller microprocessor 53. The controller 50 transceiver sends and receives computer-readable instructions that comply with a device API. An example of a preferred embodiment of a device API is sold under the trade name SMARTTHINGS. The controller transceiver 52 communicates via wireless protocol as ZigBee, Z-Wave, and IP. The controller microprocessor 53 is connected to the controller transceiver 52. The controller microprocessor 53 receives computer-readable instructions that comply with a device protocol and converts them into the signals that control the motors 40/41.

The controller microprocessor 53 can generate computer-readable messages that comply with the device protocol that describe the status of the parts of the smart adjustable bed. Particularly, the controller microprocessor 53 is programmed to process signals describing the position of the adjustable bed into computer-readable messages. The controller transceiver 52 transmits the computer-readable message to the smart hub via the wireless device network.

The preferred embodiment of the smart adjustable bed system includes a smart hub 12. Preferred embodiments of smart hubs are sold under the trademarks AMAZON ECHO and GOOGLE HOME. The smart hub 12 includes a device transceiver 61 and a server transceiver 63. A preferred embodiment of the device transceiver 61 is radio frequency transmitter. Preferred embodiments of the server transceiver 63 include wired NICs and wireless NICs. The device transceiver 61 transmits and receives computer-readable instructions according to a device API to and from the controller transceiver 52. The server transceiver 63 transmits computer-readable instructions according to a server API. The smart hub 12 includes a smart hub microprocessor 62, which acts as a network gateway interconnecting the device transceiver 61 and the server transceiver 62. The smart hub microprocessor 62 converts computer-readable instructions and messages to and from the device API and the server API.

Preferably, the smart hub 12 includes a microphone 64 connected to the smart hub microprocessor 62. The microphone 64 is placed within listening range of the smart adjustable bed. The microphone 64 is configured to send recorded sounds to the smart hub microprocessor 62. The smart hub microprocessor 62 converts the recorded sounds to recorded sounds compliant with the server API and transmits the recorded sounds compliant with the server API from the server transceiver 63 to a server 70. Typically, the server 70 is located remotely from the smart adjustable bed 30 and smart hub 12.

The smart adjustable bed system preferably includes a computer server 70. The computer server 70 includes a NIC 71 to connect it to the server network. The preferred embodiment of the server network is an IP network such as the Internet 90. The server 70 is programmed to process computer-readable instructions complying with the server API and to send computer-readable instructions complying with the server API to the smart hub 12.

Preferably, the server 70 is connected to a computerized database 72. The database 72 stores data identifying the smart adjustable bed 30, the smart hub 12, and the instructions and messages being sent to and from them, and relates them to each other.

The server 70 can be used to perform voice recognition on voice instructions recorded by the microphone 64 of the smart hub 12. Likewise, the server 70 can be used to detect snoring in the sounds recorded by the smart hub 12. In turn, the server 70 generates computer-readable instructions and messages that comply to the server API and transmit them to connected devices such as the smart hub 12.

The system preferably includes a smart device 80 which can act as an input/output display for the system. Preferred embodiments of smart devices 80 include smartphones, tablet computer, personal computers, and smartwatches. The smart device 80 has a wireless NIC 81 to connect the smart device 80 to the server 70 preferably by the internet 90 using Wi-Fi or a wireless telephone network. 8. The smart device 80 can display status information on the position (amount of incline) of the smart adjustable bed 30 that is being relayed from the smart adjustable bed 30 to smart hub 12 to the server 70 and then to the smart device 80. In addition, the smart device 80 is preferably a remote control for the smart adjustable bed 30 and can transmit signals via the server 70 through the smart hub 12 to the smart adjustable bed 30 that instruct the bed 30 to raise or lower.

A preferred method of inclining an adjustable bed utilizes the features of the smart adjustable bed system to use a smart device 80 to adjust the inclination of the smart adjustable bed 30. The first involves transmitting a computer-readable instruction to incline the adjustable bed from a smart device 80 to a server 70. The computer-readable instruction from said smart device complying with a server API. The next step involves transmitting a computer-readable instruction from the server 70 to a smart hub 12 across a server network. The preferred embodiment of the server network is the Internet. The computer-readable instruction being transmitted from the server complies with the server API. The next step is converting the computer-readable instruction from said server 70 to a computer-readable instruction that is compliant with a device API. The next step is transmitting the computer-readable instruction compliant with the device API to a controller of the smart adjustable bed 30. The next step is transmitting a signal from the controller to a motor 40 of the smart adjustable bed 30. The next step is activating the motor 40 after receiving the signal from the control until the smart adjustable bed 30 is in an inclined position.

The method can include steps that confirm the position of the smart adjustable bed 30 after the motor was activated. The first step is, after transmitting the signal to the motor 40, transmitting a computer-readable message compliant with the device API to the smart hub 12 over the device network. The computer-readable message includes information that indicates the position (i.e., amount of incline) of the smart adjustable bed 30. The next step is converting the computer-readable message compliant with the device API to a computer-readable message compliant with the server API with said smart hub 12. The smart hub microprocessor 62 performs the conversion. The next step is transmitting the computer-readable message compliant with the server API from the smart hub 12 to the server 70 over the server network. The next step is transmitting the computer-readable message compliant with the server API from the server 70 to the smart device 80. The final step is indicating the smart adjustable bed 30 is in the inclined position on the smart device 80 after receiving the computer-readable message compliant with the server API from the server 70. This position can be indicated with a pictogram of the smart adjustable bed being displayed on a screen of the smart device 80.

Another preferred method of using the smart adjustable bed system is to use voice commands to control the inclination of the smart adjustable bed 30. The first step of the method is saying a voice command to incline the smart adjustable bed 30 (e.g., "raise the bed") within hearing distance of a microphone 64 in a smart hub 12. The next step is sending the voice command from the microphone 64 to the smart hub microprocessor 62. The next step is generating with the smart hub microprocessor 62 recorded sounds compliant with a server API from the voice commands received from the microphone 64. The next step is transmitting the recorded sounds compliant with the server API from said smart hub 12 to a server 70, which is connected by the Internet. The next step is generating with the server 70 a computer-readable instruction compliant with the server API from the recorded sound compliant with the server API received from the smart hub 12. The computer-readable instruction will instruct the smart bed 30 to move to an inclined position. The next step is transmitting the computer-readable instruction compliant with the server API from the server 70 to the smart hub 12 across the Internet. The next step is converting with the smart hub microprocessor 62 the computer-readable instruction compliant with the server API to a computer-readable instruction compliant with a device API. The next step is transmitting the computer-readable instruction compliant with the device API from the smart hub 12 to a controller 50 across the device network via a wireless, ZIGBEE, Z-WAVE or the like. The next step is generating with the controller 50 a signal to activate a motor 31 of the adjustable bed 30. The next step is transmitting the signal from the controller 50 to the motor 31. The last step is activating the motor after receiving the signal from the controller 50 until the adjustable bed 30 reaches an inclined position.

A third preferred method of using the smart adjustable bed system provides a way to stop snoring. The first step is positioning a microphone 64 of a smart hub 12 within hearing distance of an adjustable bed 30. The next step is transmitting sound detected by the microphone to a microprocessor 62 in the smart hub 12. The next step is generating with the microprocessor 62 recorded sounds compliant with a server API from the sound received from the microphone 64. The next step is transmitting the recorded sounds compliant with the server API from the smart hub 12 to a remote server 70 on the Internet 90. The next step is detecting with the server 70 snoring in the recorded sounds compliant with the server API. The next step is generating with the server 70 a computer-readable instruction compliant with the server API after detecting the snoring in the recorded sound compliant with the server API. The computer-readable instruction will instruct the smart bed 30 to move to an inclined position. The next step is transmitting the computer-readable instruction compliant with the server API from the server 70 to the smart hub 12 via the Internet 90. The next step is converting with the microprocessor 62 of the smart hub 64 the computer-readable instruction compliant with the server API to a computer-readable instruction compliant with a device API. The next step is transmitting said computer-readable instruction compliant with the device API from the smart hub 12 to a controller 50 via the device network. The next step is generating with the controller 50 a signal to activate a motor 40 of the adjustable bed 30. The next step is transmitting the signal from said controller 50 to the motor 40, preferably via a bus 51. The next step is activating the motor 40 after receiving the signal from the controller 50 until the adjustable bed 30 reaches an inclined position.

The invention claimed is:

1. A smart adjustable bed system, comprising:
a bedframe having a head frame piece and a foot frame piece, said head frame piece being movable relative to said foot frame piece;
at least one motor being connected to said head frame piece, said at least one motor being connected to said foot frame piece, said at least one motor being configured to move said bedframe from a first position to a second position upon activation;
at least one sensor detecting a position of said head frame piece, a position of said foot frame piece, said at least one sensor generating a sensor signal based on said position of said head frame piece and said at least one sensor generating said sensor signal on said position of said foot frame piece;
a microprocessor being configured to receive an instruction to move said bedframe, said microprocessor receiving said sensor signal from said at least one sensor, generating position data from said sensor signal, and outputting said position data, describing said position of said at least one of said head frame piece and said foot frame piece, said position data complying with a third-party data protocol of a third-party recipient, said microprocessor receiving said instruction from a third-party smart hub service of said third-party recipient, said instruction complying with a third-party server API of said third-party recipient;
a controller being connected to said microprocessor and to said at least one motor for moving said bedframe, said controller being configured to receive said instruction to move said bedframe wherein upon receipt of said instruction said controller initiates a directive to activate said at least one motor causing movement of said bedframe from said first position to said second position; and
a transmitter being connected to said microprocessor, said transmitter receiving said position data from said microprocessor and being configured to emit an output signal containing said position data to said third-party smart hub service, said output signal complying with said third-party server API.

2. The smart adjustable bed system according to claim 1, wherein said instruction to move said bedframe is based on a voice command.

3. The smart adjustable bed system according to claim 2, wherein said voice command is received from a smart hub, said smart hub being configured to obtain said voice command and send said instruction to said microprocessor.

4. The smart adjustable bed system according to claim 3, wherein said smart hub interfaces with said third-party smart hub service according to said third-party server API to translate said voice command into said instruction.

5. The smart adjustable bed system according to claim 1, wherein upon detection of a snoring event, said instruction initiates movement of said head frame piece into said second position that is inclined.

6. The smart adjustable bed system according to claim 1, wherein said first position is a flat position and said second position is inclined.

7. The smart adjustable bed system according to claim 1, wherein said first position is an inclined position and said second position is a declined position.

8. A smart adjustable bed system, comprising:
a bedframe having a head frame piece and a foot frame piece, said head frame piece being movable relative to said foot frame piece to move said head frame piece from a flat position to an inclined position;
at least one sensor detecting a position of said bedframe, said at least one sensor generating a sensor signal based on said position of said bedframe;
at least one motor connected to at least one of said head frame piece and said foot frame piece, said at least one motor configured to move said head frame piece into said inclined position upon activation;
a microprocessor configured to initiate an instruction to move said head frame piece into said inclined position upon detection of a snoring event, said microprocessor receiving said sensor signal from said at least one sensor, generating position data from said sensor signal, and outputting said position data, said position data describing said position of said bedframe, and said position data complying with a third-party server API of a third-party smart hub service;

a controller connected to said at least one motor, said controller being configured to receive said instruction to move said head frame piece into said inclined position upon detection of said snoring event wherein upon receipt of said instruction said controller initiates a directive to activate said at least one motor causing movement of said head frame piece into said inclined position; and a transmitter being connected to said microprocessor, said transmitter receiving said position data from said microprocessor and being configured to emit an output signal containing said position data to said third-party smart hub service, said output signal complying with said third-party server API.

9. A smart adjustable bed system, comprising:

a bedframe having a head frame piece and a foot frame piece, said head frame piece being movable relative to said foot frame piece to move said bedframe from a flat position to an inclined position;

at least one sensor detecting a position of said bedframe, said at least one sensor generating a sensor signal based on said position of said bedframe;

at least one motor being connected to at least one of said head frame piece and said foot frame piece, said at least one motor being configured to move said head frame piece into said inclined position upon activation;

a microprocessor being configured to initiate an instruction to move said head frame piece into said inclined position upon detection of a voice command, said microprocessor receiving said sensor signal from said at least one sensor, generating position data from said sensor signal, and outputting said position data, said position data describing said position of said bedframe, and said position data complying with a third-party server API of a third-party smart hub service;

a controller being connected to said at least one motor, said controller being configured to receive said instruction to move said head frame piece into said inclined position upon detection of said voice command wherein upon receipt of said instruction said controller initiates a directive to activate said at least one motor causing movement of said head frame piece into said inclined position; and a transmitter being connected to said microprocessor, said transmitter receiving said position data from said microprocessor and being configured to emit an output signal containing said position data to said third-party smart hub service, said output signal complying with said third-party server API.

10. A method for inclining an adjsutable bedframe when a voice command is detected, comprising:

A method for inclining an adjustable bedframe when a voice obtaining said voice command instructing said adjustable bedframe to move to an inclined position;

sending a computer-readable instruction to a controller to move said adjustable bedframe upon detection of said voice command;

transmitting a signal from said controller to at least one motor within said adjustable bedframe;

activating said at least one motor to cause said adjustable bedframe to move into said inclined position in response to said voice command;

generating a sensor signal based on a position of said adjustable bedframe;

converting said sensor signal to position data, said position data describing said position of said adjustable bedframe, and said position data complying with a third-party server API of a third party smart hub service; and transmitting said position data in an output signal, said output signal complying with said third-party server API.

11. A method for moving an adjustable bedrame when a snoring event is detected, comprising:

sending a computer-readable instruction to incline a head frame piece of said adjustable bedframe upon detection of said snoring event;

transmitting a signal from a controller to at least one motor within said adjustable bedframe upon receipt of said computer-readable instruction;

activating said at least one motor to cause a head frame to move into an inclined position in response to said snoring event;

activating said at least one motor to cause said adjustable bedframe to move into said inclined position in response to said snoring event;

generating a sensor signal based on a position of said adjustable bedframe;

converting said sensor signal to position data, said position data describing said position of said adjustable bedframe, and said position data complying with a third-party server API of a third party smart hub service; and transmitting said position data in an output signal to said third-party smart hub service, said output signal complying with said third-party server API.

12. A method of moving an adjustable bedframe via a smart device comprising:

sending a computer-readable instruction to incline a head frame piece of an adjustable bedframe upon detection of an external signal from a smart device;

transmitting a signal from a controller to at least one motor within said adjustable bedframe;

activating said at least one motor upon receipt of said signal to cause said head frame piece to move into an inclined position in response to said external signal;

activating said at least one motor to cause said adjustable bedframe to move into said inclined position in response to said external signal;

generating a sensor signal based on a position of said adjustable bedframe;

converting said sensor signal to position data, said position data describing said position of said adjustable bedframe, and said position data complying with a third-party server API of a third party smart hub service; and transmitting said position data in an output signal to said third-party smart hub service, said output signal complying with said third-party server API.

13. The method according to claim 12, further comprising:

determining said head frame piece is in said inclined position;

transmitting a message to said smart device indicating said head frame piece is in said inclined position; and displaying on said smart device a pictogram indicating said adjustable bedframe is in said inclined position.

14. A method for reporting a position of an adjustable bedframe which comprises:

generating a sensor signal based on a position of said adjustable bedframe;

converting said sensor signal to position data, said position data describing said position of said adjustable bedframe, and said position data complying with a third-party server API of a third party smart hub service; and transmitting said position data in an output signal to said third-party smart hub service, said output signal complying with said third-party server API.

15. The method according to claim 14, which further comprises: attaching at least one sensor to said adjustable bedframe; and generating said sensor signal with said at least one sensor.

16. The method according to claim 15, which further comprises:

connecting a microprocessor to said at least one sensor; and converting said sensor signal to said position data with said microprocessor.

17. The method according to claim 14, which further comprises:

connecting a transmitter to a microprocessor; and transmitting said output signal containing said position data with said transmitter.

\* \* \* \* \*